US012151301B2

(12) United States Patent
Lin et al.

(10) Patent No.: US 12,151,301 B2
(45) Date of Patent: Nov. 26, 2024

(54) FRICTION STIR WELDING TOOL HOLDER WITH THERMAL SENSOR

(71) Applicant: National Chung Cheng University, Chiayi (TW)

(72) Inventors: Pai-Chen Lin, Chiayi (TW); Zhen-Wei Zhuang, Chiayi (TW)

(73) Assignee: NATIONAL CHUNG CHENG UNIVERSITY, Chiayi (TW)

( * ) Notice: Subject to any disclaimer, the term of this patent is extended or adjusted under 35 U.S.C. 154(b) by 63 days.

(21) Appl. No.: 18/189,829

(22) Filed: Mar. 24, 2023

(65) Prior Publication Data
US 2024/0316687 A1 Sep. 26, 2024

(51) Int. Cl.
*B23K 20/12* (2006.01)
*B23K 37/00* (2006.01)

(52) U.S. Cl.
CPC ........ *B23K 20/1255* (2013.01); *B23K 20/123* (2013.01); *B23K 37/003* (2013.01)

(58) Field of Classification Search
CPC ...... B23K 20/122–128; B23K 20/1255; B23K 20/123; B23K 37/003
USPC ................................ 228/112.1, 2.1, 46, 200
See application file for complete search history.

(56) References Cited

U.S. PATENT DOCUMENTS

| 2006/0169741 | A1* | 8/2006 | Smith | B23K 20/126 228/2.1 |
| 2010/0147925 | A1* | 6/2010 | Hanlon | B23K 20/233 228/2.1 |
| 2017/0266755 | A1* | 9/2017 | Katoh | F16C 19/30 |
| 2017/0266756 | A1* | 9/2017 | Katoh | B23K 20/1255 |
| 2019/0061048 | A1* | 2/2019 | Fleck | B23K 20/122 |

FOREIGN PATENT DOCUMENTS

| CN | 105855693 | A | * | 8/2016 | |
| CN | 105921877 | A | * | 9/2016 | ........... B23K 20/123 |
| CN | 105921878 | A | * | 9/2016 | ........... B23K 20/123 |
| CN | 106001897 | A | * | 10/2016 | ........ B23K 20/1255 |
| CN | 106271027 | A | * | 1/2017 | ........... B23K 20/126 |
| CN | 105033447 | B | * | 8/2017 | |
| CN | 107378167 | A | * | 11/2017 | ............. B23K 1/008 |
| CN | 107414281 | A | * | 12/2017 | |
| CN | 107470773 | A | * | 12/2017 | ........... B23K 20/125 |
| CN | 107999953 | A | * | 5/2018 | ........ B23K 20/1255 |

(Continued)

*Primary Examiner* — Kiley S Stoner
(74) *Attorney, Agent, or Firm* — Muncy, Geissler, Olds & Lowe, P.C.

(57) ABSTRACT

A friction stir welding tool holder is provided and includes: a tool holder cone, an end thereof is connected to the rotating spindle, a cone flow channel is formed therein, the cone flow channel has a valve, and the tool holder cone further has a tool locking ring, and the tool locking further has a tool accommodation groove axially arranged and a thermal sensing slot laterally arranged; a cutting tool, axially movable relative to the tool holder cone, where the cutting tool is arranged in the tool accommodation groove and has a machining end protruding from the tool accommodation groove; a torque transmission system, arranged between the tool holder cone and the cutting tool to transmit torque from the tool holder cone to the cutting tool; and a thermal sensor, inserted in the thermal sensing slot to sense a temperature of the cutting tool at any time.

4 Claims, 13 Drawing Sheets

(56) References Cited

FOREIGN PATENT DOCUMENTS

| | | | | | |
|---|---|---|---|---|---|
| CN | 108044229 A | * | 5/2018 | ........... | B23K 20/122 |
| CN | 108145294 A | * | 6/2018 | ............. | B23K 10/02 |
| CN | 108772623 A | * | 11/2018 | ......... | B23K 20/1245 |
| CN | 108971744 A | * | 12/2018 | ........ | B23K 20/122 |
| CN | 109048044 A | * | 12/2018 | ........ | B23K 20/1255 |
| CN | 108555432 B | * | 7/2019 | ........... | B23K 20/122 |
| CN | 110102873 A | * | 8/2019 | | |
| CN | 113001008 A | * | 6/2021 | ......... | B23K 20/1245 |
| CN | 113210898 A | * | 8/2021 | ............. | B23K 10/02 |
| CN | 113953646 A | * | 1/2022 | | |
| CN | 113953650 A | * | 1/2022 | | |
| CN | 113953651 A | * | 1/2022 | | |
| CN | 106891089 B | * | 6/2022 | ........... | B23K 20/125 |
| CN | 114929426 A | * | 8/2022 | ............. | B22F 10/28 |
| CN | 115464250 A | * | 12/2022 | | |
| CN | 116329732 A | * | 6/2023 | | |
| CN | 116511687 B | * | 10/2023 | ......... | B23K 20/1245 |
| DE | 202007009465 U1 | * | 9/2008 | ......... | B23K 20/1235 |
| DE | 202014003072 U1 | * | 6/2014 | ......... | B23K 20/1245 |
| DE | 102014004331 B3 | * | 6/2015 | ........... | B23K 20/124 |
| DE | 102014005315 B3 | * | 6/2015 | ........... | B23K 20/121 |
| DE | 102014001050 A1 | * | 7/2015 | ......... | B23K 20/1245 |
| DE | 102014010058 A1 | * | 1/2016 | ........... | B23K 20/122 |
| DE | 102016007585 B3 | * | 11/2017 | ........... | B23K 20/125 |
| DE | 102016113289 A1 | * | 1/2018 | ........... | B23K 20/122 |
| DE | 102016217025 A1 | * | 3/2018 | | |
| DE | 202018001178 U1 | * | 4/2018 | | |
| DE | 202019003737 U1 | * | 11/2019 | | |
| EP | 2514551 A1 | * | 10/2012 | ......... | B23K 20/1245 |
| FR | 3046096 A1 | * | 6/2017 | | |
| JP | H08132235 A | * | 5/1996 | | |
| JP | 2712838 B2 | | 2/1998 | | |
| JP | 2006021250 A | * | 1/2006 | ........... | B23K 20/1255 |
| JP | 6143915 B1 | * | 6/2017 | ............. | B23K 20/12 |
| KR | 20120055035 A | * | 5/2012 | | |
| KR | 20190091869 A | * | 8/2019 | | |
| KR | 102423089 B1 | * | 7/2022 | | |
| WO | WO-2007006669 A1 | * | 1/2007 | ........... | B23K 20/123 |
| WO | WO-2017025078 A1 | * | 2/2017 | ........... | B23K 20/1235 |
| WO | WO-2021081295 A1 | * | 4/2021 | ........... | B23K 20/1255 |

* cited by examiner

FRICTION STIR WELDING TOOL HOLDER WITH THERMAL SENSOR

BACKGROUND

Technical Field

The present invention relates to a friction stir welding tool holder. In particular, a friction stir welding tool holder with a thermal sensor.

Related Art

A friction stir manner used to weld two pieces of metal (usually aluminum) together has been published. First, a friction stir welding (FSW) technology is published by The Welding Institute (TWI) in 1991, and later, a technology is described in a Japanese patent "U.S. Pat. No. 2,712,838", and a patent name is "FRICTION WELDING METHOD". In the technologies, a tool head of a cutting tool rotating at a high speed is inserted into two pieces of fitted metal, heat generated by friction of the tool head rotating at a high speed and the two pieces of metal are used, so that yield strength of a part that the two pieces of metal are in contact with the tool head is decreased and the part is maintained to be in a low-strength solid state. The tool head stirs and combines parts of the two pieces of metal in which yield strength is decreased, yield strengths of the cooled two pieces of metal are gradually recovered, so that the two pieces of metal are integrally welded. In short, the friction stir welding technology is to rotate workpieces by a cutting tool piercing between the two workpieces to convert mechanical kinetic energy of the cutting tool into heat energy, so that the two workpieces undergo plastic deformation due to being heated, and a purpose of combining the two workpieces is achieved due to material stir.

In other words, the friction stir welding technology is that a tool head piercing between the two workpieces performs rotation and friction on the workpieces to convert mechanical kinetic energy of the tool head into heat energy, so that parts of the two workpieces that friction is performed on undergo plastic deformation due to being heated, and the purpose of combining the two workpieces is achieved due to material stir.

In friction stir welding, heat generated by friction stir causes the workpieces to have plasticity, so heat generated during a friction stir process needs to be detected. Although attempts have been made in the past to provide a method to monitor a stir temperature, there are still deficiencies, such as a problem that strength of a tool head may be reduced. Therefore, it is necessary to discuss how to monitor the stir temperature while maintaining strength of the tool head.

SUMMARY

Based on the foregoing reasons, an objective of the present invention is to provide a friction stir welding tool holder with a thermal sensor. By setting a thermal sensor in a static shaft shoulder assembly of a welding head and/or a tool locking ring of a tool holder, damage to a structure of the tool head is avoided, structural strength is maintained, and a temperature of the cutting tool is sensed at any time to monitor a stir temperature in time.

To achieve the foregoing objective, the present invention provides a friction stir welding tool holder for mounting on a rotating spindle of a machining shaft of a machine tool, and the friction stir welding tool holder comprises: a tool holder cone, where an end of the tool holder cone is connected to the rotating spindle, a cone flow channel is formed in the tool holder cone, the cone flow channel has a valve, and the tool holder cone further has a tool locking ring, and the tool locking ring further has a tool accommodation groove axially arranged and a thermal sensing slot laterally arranged; a cutting tool, axially movable relative to the tool holder cone, where the cutting tool is arranged in the tool accommodation groove and has a machining end protruding from the tool accommodation groove; a torque transmission system, arranged between the tool holder cone and the cutting tool to transmit torque from the tool holder cone to the cutting tool; and a thermal sensor, inserted in the thermal sensing slot to sense a temperature of the cutting tool at any time.

In some embodiments, a first cooling flow channel is formed in the torque transmission system. The friction stir welding tool holder further comprises a valve body, linked to the cutting tool and selectively sealing the valve. When the cutting tool is in contact with the two workpieces and moves axially toward the tool holder cone, the valve body does not seal the valve, so that the cone flow channel is in communication with the first cooling flow channel; and when the cutting tool is not in contact with the two workpieces, the valve body seals the valve, so that the cone flow channel is not in communication with the first cooling flow channel.

In some embodiments, the thermal sensor is wirelessly connected to a terminal and the thermal sensor is a thermal sensing probe.

In some embodiments, a cone accommodation cavity is formed in the tool holder cone, and the cone accommodation cavity has a spline sliding joint section, a bushing accommodation section adjacent to the spline sliding joint section, and a first splined groove formed in the bushing accommodation section. The torque transmission system comprises: a spline bushing, accommodated in the bushing accommodation section and having a bushing outer surface and a bushing splined groove formed on the bushing outer surface; a first parallel spline, splined between the tool holder cone and the spline bushing and accommodated in the first splined groove and the bushing splined groove, and configured to transmit torque between the tool holder cone and the spline bushing; a spline pivot, axially slidably arranged through and splined with the spline bushing, where the spline pivot has a spline head end axially slidable on the spline sliding joint section and a spline tail end, and the spline tail end is not accommodated in the spline bushing and forms a spline splined groove; a spring seat, having a spring seat accommodation cavity and a second splined groove formed in the spring seat accommodation cavity, where the spring seat accommodation cavity is configured to accommodate a part of the spline pivot; a second parallel spline, splined between the spline pivot and the spring seat and accommodated in the spline splined groove and the second splined groove, and configured to transmit torque between the spline pivot and the spring seat; and the tool locking ring, fixedly connected to the spring seat, where the first cooling flow channel runs through the spline pivot, the spring seat, and the tool locking ring.

The technical features and advantages of the present disclosure have been quite extensively summarized above, so that the detailed description of the present disclosure below can be better understood. Other technical features and advantages that constitute the scope of the patent application of the present disclosure will be described below. A person of ordinary skill in the art of the present disclosure should understand that the concepts and specific embodiments disclosed below can be used fairly easily to modify or design other structures or processes to achieve the same purpose as the present disclosure. A person of ordinary skill in the art of the present disclosure should also understand that such equivalent constructions cannot depart from the spirit and scope of the present disclosure as defined by the attached patent scope.

DETAILED DESCRIPTION

Figure 1:
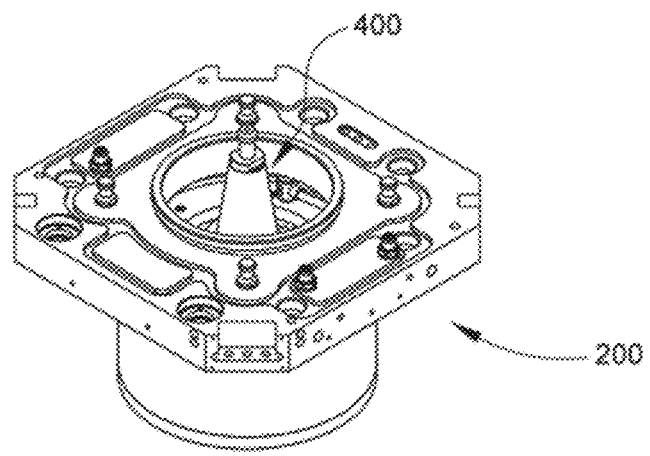
FIG. 1 is a three-dimensional view of an embodiment of a friction stir welding head according to the present invention.
Figure 2:
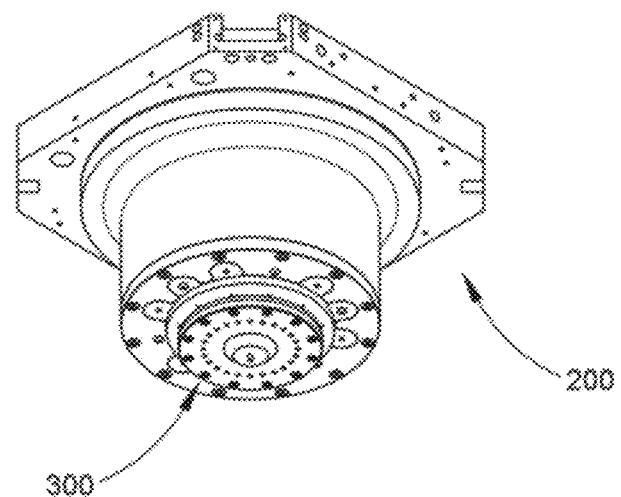
FIG. 2 is a three-dimensional view of an embodiment of a friction stir welding head from another angle according to the present invention.
Figure 3:
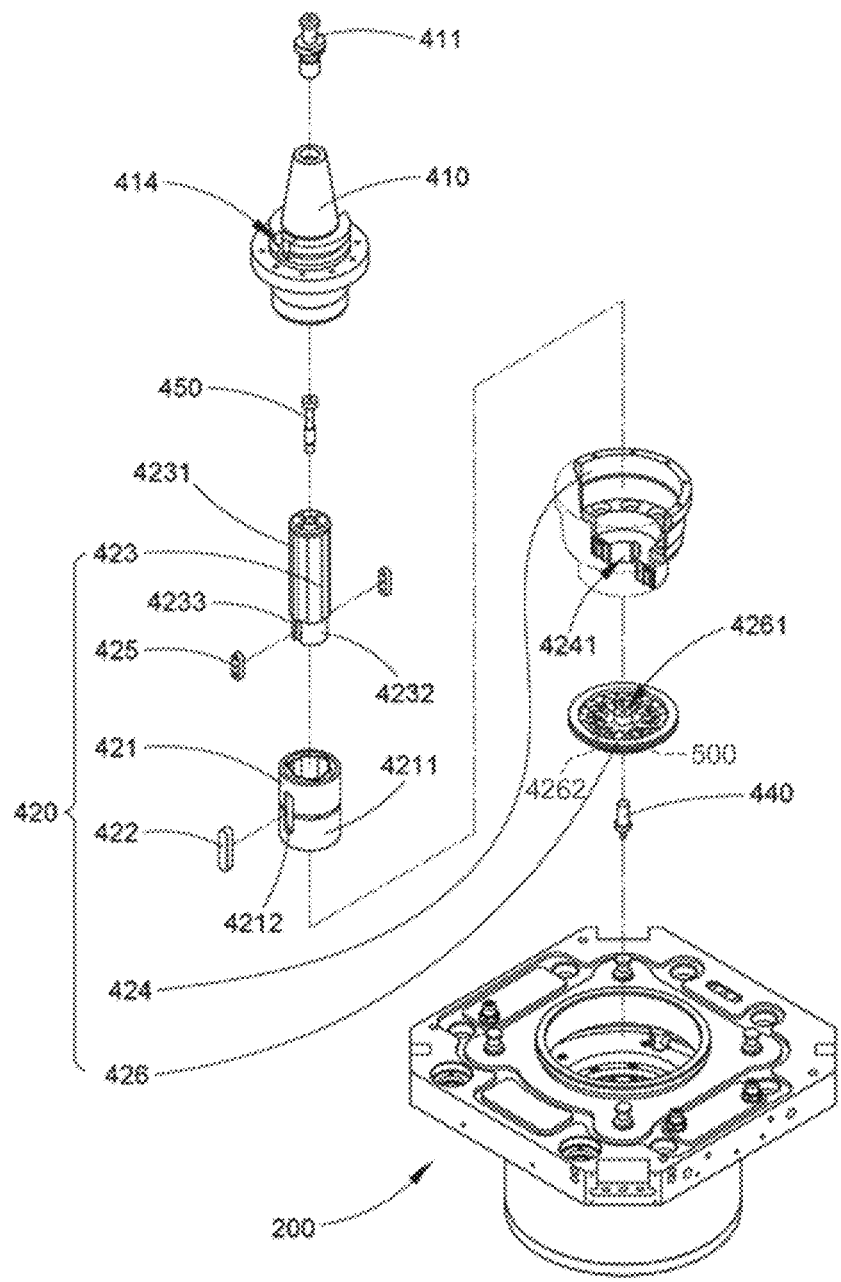
FIG. 3 is an exploded view of an embodiment of a friction stir welding head according to the present invention, mainly showing a torque transmission system.
Figure 4:
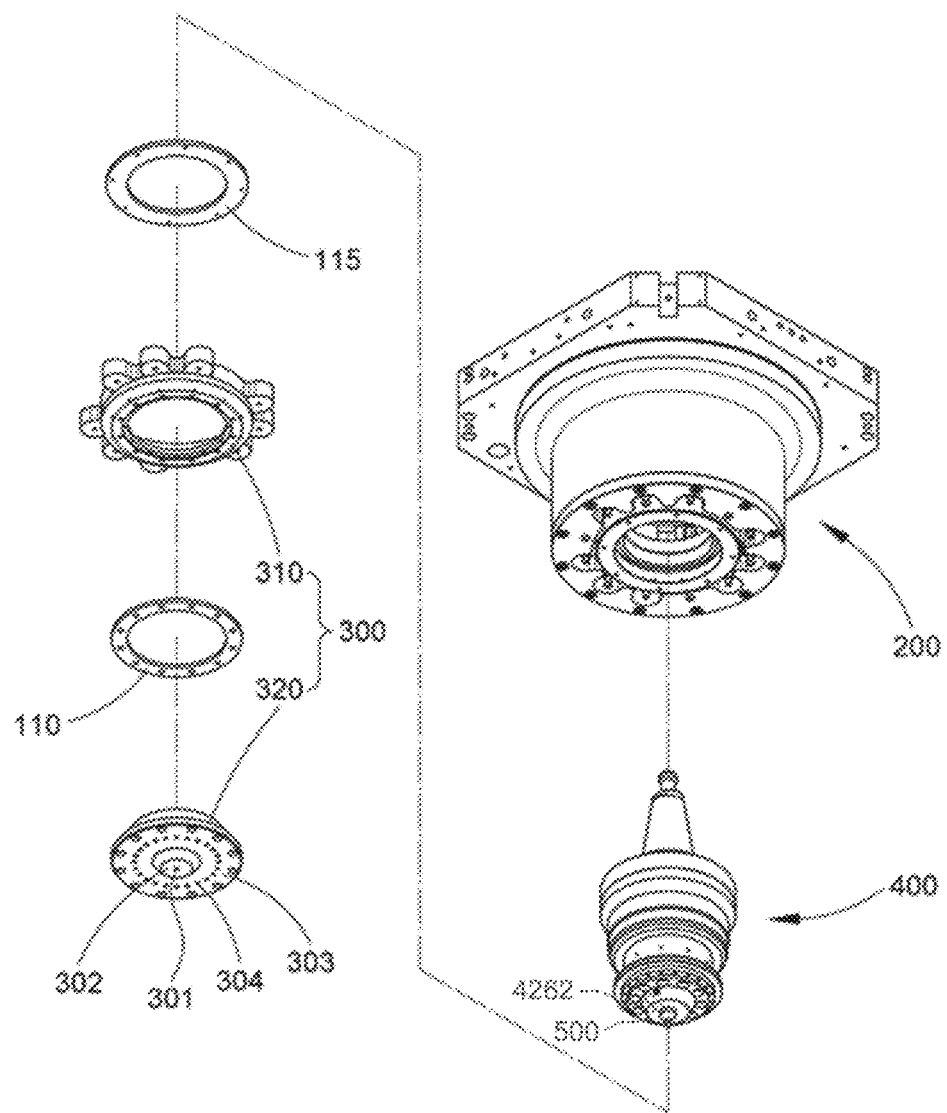
FIG. 4 is another exploded view of an embodiment of a friction stir welding head according to the present invention, mainly showing a static shaft shoulder system.
Figure 5:
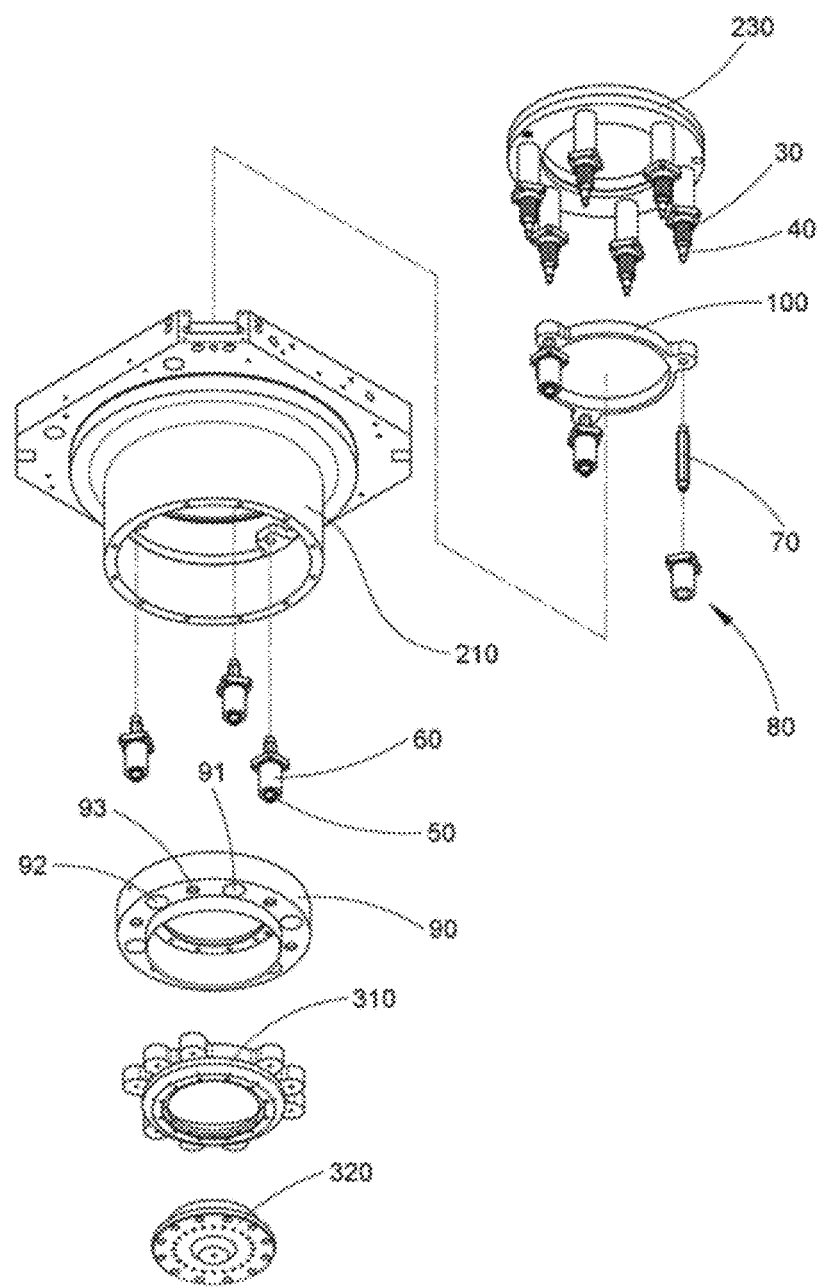
FIG. 5 is another exploded view of an embodiment of a friction stir welding head according to the present invention, mainly showing a piston, a first guide post, and a second guide post, and a friction stir welding tool holder and some elements are omitted and are not drawn.
Figure 6:
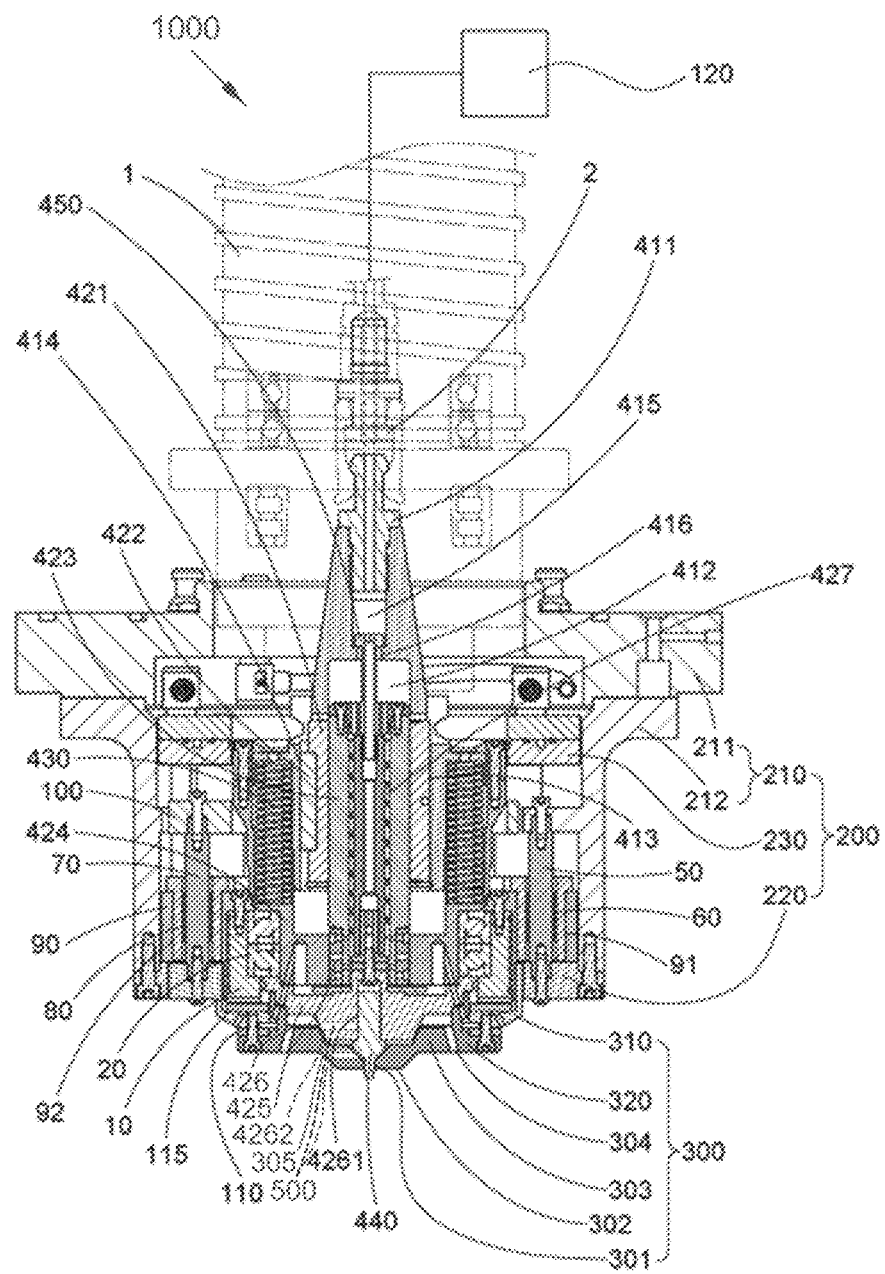
FIG. 6 is a schematic cross-sectional view of one embodiment of a friction stir welding head according to the present invention.
Figure 7:
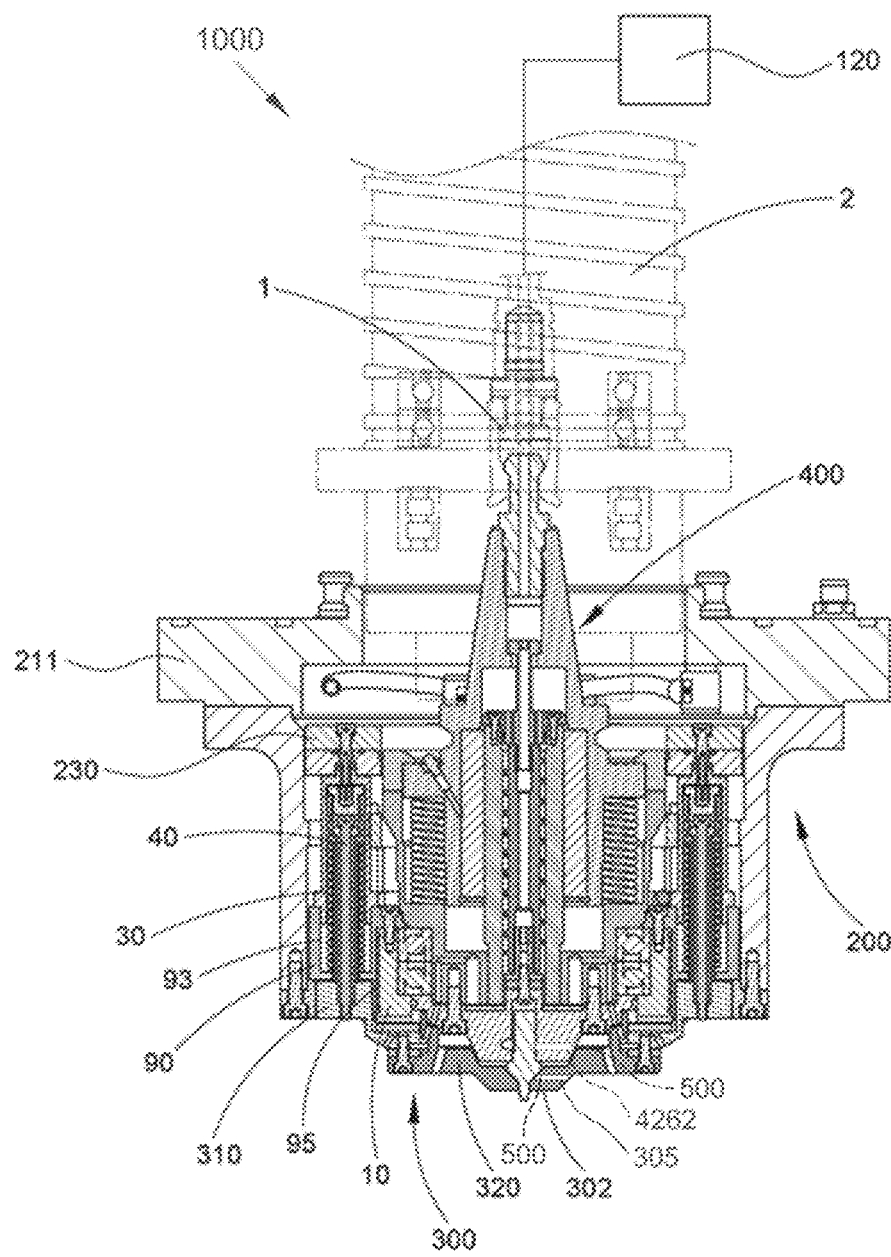
FIG. 7 is a schematic cross-sectional view of an embodiment of a friction stir welding head from another angle according to the present invention.
Figure 8:
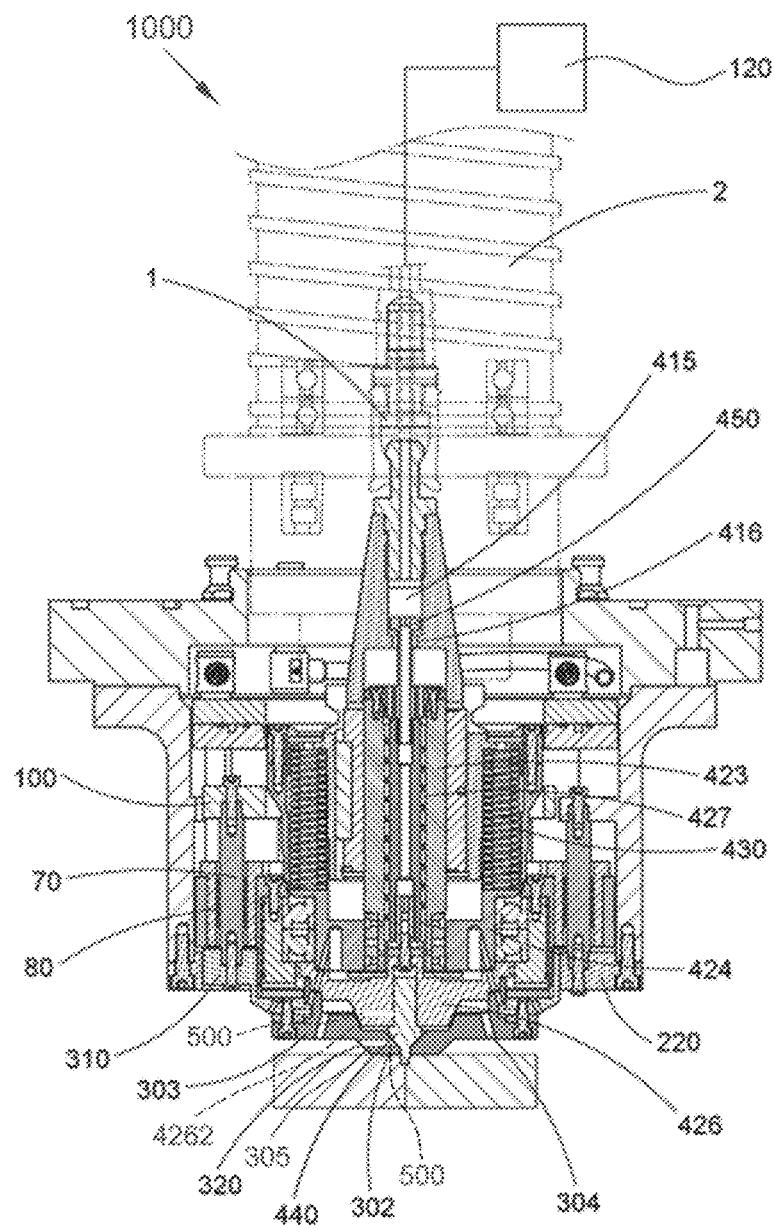
FIG. 8 is a schematic cross-sectional view of a welding process of an embodiment of a friction stir welding head according to the present invention.
Figure 9:
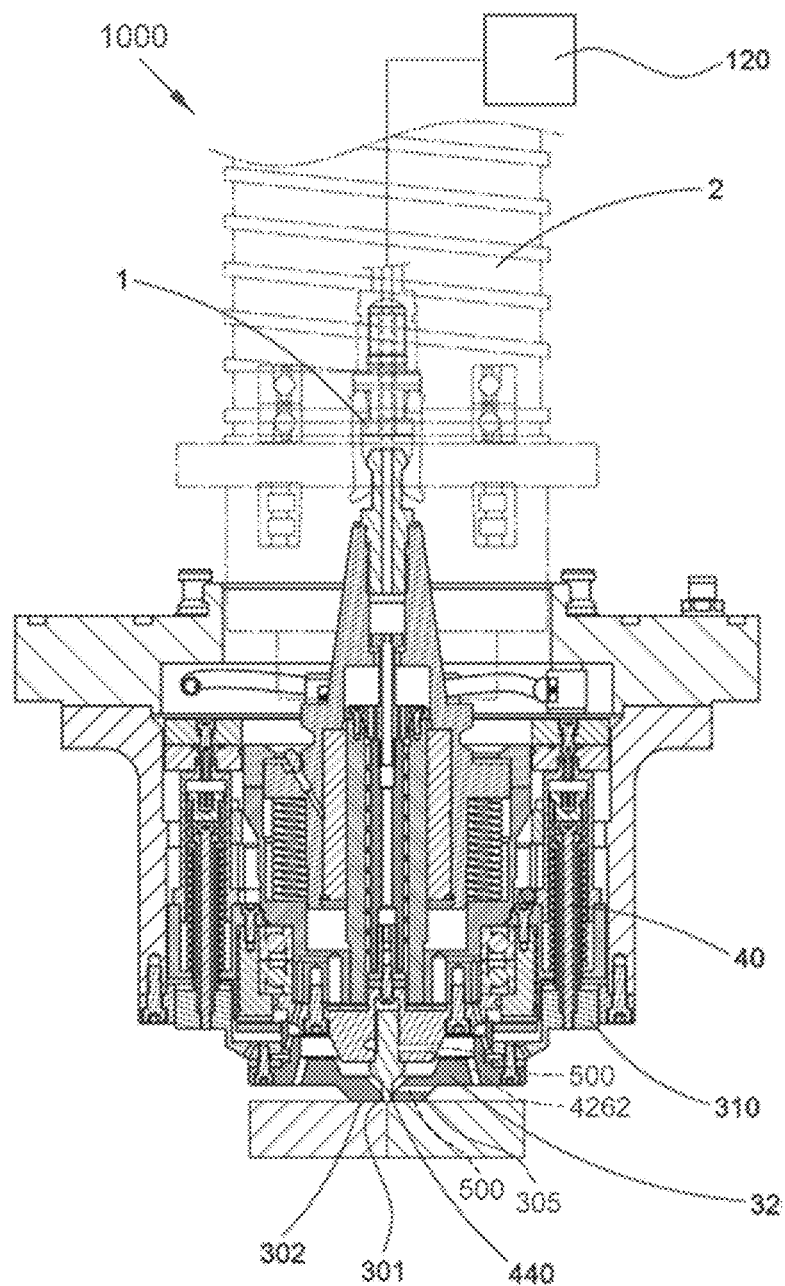
FIG. 9 is a schematic cross-sectional view of a tool exit process of an embodiment of a friction stir welding head according to the present invention.

Referring to FIG. 1 to FIG. 9, an embodiment of a friction stir welding head 1000 (referred to as a welding head for short in the following) of the present invention. The welding head 1000 may be mounted on a machining shaft of a machine tool to perform friction stir welding on two workpieces. The machining shaft has a rotating spindle 1 and a spindle frame 2 accommodating the rotating spindle 1. The welding head 1000 includes a head seat group 200, a static shaft shoulder assembly 300, a friction stir welding tool holder 400 (referred to as a welding tool holder for short in the following), a ball bearing bushing 10, at least one ball bearing 20, at least one piston spring 30, at least one piston 40, at least one first guide post 50, at least one first linear bearing 60, at least one second guide post 70, at least one second linear bearing 80, a linear bearing fixing ring 90, a guide post fixing ring 100, a first thermal insulation ring 110, a second thermal insulation ring 115, and a fluid parameter sensor 120.

The head seat group 200 is fixedly connected to the spindle frame 2, inside of the head seat group 200 encloses and forms a head seat accommodation cavity. The head seat group 200 includes a head seat 210, a head seat flange 220, and a piston fixing disk 230. The head seat 210 is fixedly connected to the spindle frame 2, and the head seat flange 220 is arranged at an end of the head seat 210 away from the spindle frame 2. For ease of assembly, the head seat 210 may be divided into a head seat upper portion 211 and a head seat lower portion 212, the head seat upper portion 211 includes an oil pressure pipe and a cooling pipe, and the head seat lower portion 212 generally defines a side surface contour of the head seat accommodation cavity.

The static shaft shoulder assembly 300 may be axially movably arranged on a side of the head seat group 200 away from the spindle frame 2. To be more specific, the static shaft shoulder assembly 300 may be axially movably inserted to the head seat flange 220. The static shaft shoulder assembly 300 has a tool hole 301, a shaft shoulder 302 surrounding the cutting tool hole 301, a gas nozzle disk 303 surrounding the shaft shoulder 302, and at least one gas nozzle 304 formed on the gas nozzle disk 303, where the shaft shoulder 302 is more protruding than the gas nozzle disk 303 and can press against the workpieces during friction stir welding. More specifically, the static shaft shoulder assembly 300 includes a tool exit pressure ring 310 and a static shaft shoulder ring 320. The tool exit pressure ring 310 is arranged on a side of the head seat group 200 away from the spindle frame 2, the static shaft shoulder ring 320 is connected to the tool exit pressure ring 310 but is not in direct contact with the head seat group 200, and the cutting tool hole 301, the shaft shoulder 302, the gas nozzle disk 303, and the gas nozzle 304 are formed on the static shaft shoulder ring 320. The static shaft shoulder assembly 300 further includes a laterally arranged thermal sensing slot 305.

The welding tool holder 400 is accommodated in the head seat accommodation cavity and is for mounting on the rotating spindle 1. The welding tool holder has a tool holder cone 410, a torque transmission system 420, at least one tool holder spring 430, a cutting tool 440, and a valve body 450. An end of the tool holder cone 410 is for mounting on the rotating spindle 1 and is provided with a pull rod bolt 411. The tool holder cone 410 has a cone accommodation cavity, the cone accommodation cavity has a spline sliding joint section 412, a bushing accommodation section 413 adjacent to the spline sliding joint section 412, and a first splined groove 414 formed on the bushing accommodation section 413. For cooling and tool holder control purposes, a cone flow channel 415 is further formed in the tool holder cone 410. The cone flow channel 415 has a valve 416, and a gas flow can be introduced into the cone flow channel 415 during friction stir welding. The torque transmission system 420 includes a spline bushing 421, a first parallel spline 422, a spline pivot 423, a spring seat 424, a second parallel spline 425, and a tool locking ring 426. The spline bushing 421 is accommodated in the bushing accommodation section 413. The spline bushing 421 has a bushing outer surface 4211 and a bushing splined groove 4212 formed on the bushing outer surface 4211. The first parallel spline 422 is splined between the tool holder cone 410 and the spline bushing 421 and is accommodated in the first splined groove 414 and the bushing splined groove 4212, and is configured to transmit torque between the tool holder cone 410 and the spline bushing 421. The spline pivot 423 may be axially slidably arranged through and splined with the spline bushing 421. The spline pivot 423 has a spline head end 4231 axially slidable on the spline sliding joint section 412 and a spline tail end 4232, and the spline tail end 4232 is not accommodated in the spline bushing 421 and forms a spline splined groove 4233. The spring seat 424 has a spring seat accommodation cavity and a second splined groove 4241 formed in the spring seat accommodation cavity, where the spring seat accommodation cavity is configured to accommodate a part of the spline pivot 423. The second parallel spline 425 is splined between the spline pivot 423 and the spring seat 424 and is accommodated in the spline splined groove 4233 and the second splined groove 4241 to transmit torque between the spline pivot 423 and the spring seat 424. The tool locking ring 426 is fixedly connected to the spring seat 424 and has a tool accommodation groove 4261. The torque transmission system 420 further forms a first cooling flow channel 427. The first cooling flow channel 427 extends through the spline pivot 423, the spring seat 424, and the tool locking ring 426, and the gas nozzle 304 of the static shaft shoulder assembly 300 is in communication with the first cooling flow channel 427. The tool holder spring 430 is arranged between the tool holder cone 410 and the spring seat 424, and is mainly configured to provide a forge force required for friction stir welding. The cutting tool 440 is arranged in the tool accommodation groove 4261 and has a machining end protruding from the tool accommodation groove 4261, and a part of the cutting tool 440 may protrude from the tool hole 301 of the static shaft shoulder assembly 300. Through the torque transmission system 420, torque can be transmitted from the tool holder cone 410 to the cutting tool 440, and the spline pivot 423, the spring seat 424, the tool locking ring 426, and the cutting tool 440 are allowed to be axially movable to the tool holder cone 410.

In addition, the tool locking ring 426 further includes a laterally arranged thermal sensing slot 4262.

A thermal sensor 500 is inserted in the thermal sensing slot 305 or a thermal sensing slot 4262 to sense a temperature of the cutting tool 440 at any time. In some embodiments, when the thermal sensor 500 is inserted in the thermal sensing slot 305, the thermal sensor 500 is wirelessly connected to a terminal (not shown). In some embodiments, when the thermal sensor 500 is inserted in the thermal sensing slot 4262, the thermal sensor 500 is connected to a terminal (not shown) is a wired manner. In some embodiments, the thermal sensor 500 is a thermal sensing probe.

The valve body 450 is arranged on the spline pivot 423 and linked to the cutting tool 440, and selectively seals the valve 416. When the valve body 450 seals the valve 416, the cone flow channel 415 is not in communication with the first cooling flow channel 427. When the valve body 450 does not seal the valve 416, the cone flow channel 415 is in communication with the first cooling flow channel 427, so that the gas flow can flow through the cone flow channel 415 and the first cooling flow channel 427 in sequence and is sprayed out from the gas nozzle 304. The fluid parameter sensor 120 is configured to sense a fluid parameter change of the gas flow in the flow channel, thereby achieving the purposes of cooling and tool holder control. The detailed principle is described below. The fluid parameter sensor 120 may be arranged at any location at which a gas flow fluid parameter can be sensed. For example, the fluid parameter sensor may be arranged in the cone flow channel, the first cooling flow channel, or even a gas flow channel inside a machining shaft on upstream of the cone flow channel, provided that a fluid parameter change of the gas flow can be sensed. The fluid parameter may be gas pressure and/or a flow rate.

The ball bearing bushing 10 is arranged in the head seat accommodation cavity, and the ball bearing 20 is arranged between the ball bearing bushing 10 and the welding tool holder 400 to transmit a force between the ball bearing bushing and the welding tool holder. More specifically, a ball bearing accommodation cavity is formed between the ball bearing bushing 10 and the spring seat 424, and the ball bearing 20 is arranged in the ball bearing accommodation cavity for transmitting a force between the ball bearing bushing 10 and the spring seat 424, such as an axial forge force generated when the tool holder spring 430 is compressed.

The piston 40 is arranged between the head seat group 200 and the static shaft shoulder assembly 300, and a length of the piston 40 in an axial direction of the welding tool holder 400 is variable, so that the static shaft shoulder assembly 300 may be axially movable to the welding tool holder 400, and the shaft shoulder 302 is allowed to press against the workpieces. More specifically, an end of the piston 40 is arranged on the piston fixing disk 230 and connected to the oil pressure pipe of the head seat upper portion 211. The axial length is changed by driving of oil pressure, and an other end of the piston 40 is arranged on the tool exit pressure ring 310.

A quantity of the first guide posts 50 is the same as a quantity of the first linear bearings 60. The first guide post 50 extends axially through and is arranged on the first linear bearing 60. The first guide post 50 is connected between the head seat 210 and the head seat flange 220 to transmit a force borne by the welding head 1000 to the spindle frame 2 through the head seat 210 during friction stir welding.

A quantity of the second guiding posts 70 is the same as a quantity of second linear bearings 80. The second guide post 70 axially extends through and is arranged on the second linear bearing 80. The second guide post 70 is connected between the guide post fixing ring 100 and the static shaft shoulder assembly 300. Arrangement of the second guide post 70 and the second linear bearing 80 can allow the static shaft shoulder assembly 300 to move axially smoothly. The guide post fixing ring 100 can be configured to locate the second guide post, and can also be configured to limit a stroke of axial movement of the static shaft shoulder assembly 300, having a stroke limit protection effect.

The linear bearing fixing ring 90 has at least one first bearing hole 91, at least one second bearing hole 92, and a piston via 93. The linear bearing fixing ring 90 is fixed to a peripheral edge of the ball bearing bushing 10 to position the first linear bearing 60 and the second linear bearing 80 and transmit a force. The first linear bearing 60 is arranged in the first bearing hole 91, the second linear bearing 80 is arranged in the second bearing hole 92, and the piston 40 is arranged through the piston via 93. The piston spring 30 is arranged between the piston 40 and the linear bearing fixing ring 90 to push the static shaft shoulder assembly 300 in a direction of the machining shaft when the piston 40 is not in operation. A side force and a lateral borne by the cutting tool during welding may be transmitted to the first linear bearing 60, the second linear bearing 80, the first guide pose 50, and the second guide post 70 through the ball bearing 20 and the ball bearing bushing 10, and then transmitted to the spindle frame 2 through the head seat flange 220 and the head seat 210, thereby protecting the torque transmission system and avoiding damage.

The first thermal insulation ring 110 is arranged between the tool exit pressure ring 310 and the static shaft shoulder ring 320, and the second thermal insulation ring 115 is arranged between the tool exit pressure ring 310 and the ball bearing bushing 10. Thermal conductivity coefficients of the first thermal insulation ring 110 and the second thermal insulation ring 115 are lower than that of the tool exit pressure ring 310, the static shaft shoulder ring 320, and the ball bearing bushing 10, to reduce thermal energy transmitted to inside of the welding head 1000. The first thermal insulation ring 110 and the second thermal insulation ring 115 may form a good thermal insulation system to prevent a bearing-related element from being damaged due to overheating. In addition, a second cooling flow channel 95 exists between the linear bearing fixing ring 90 and the ball bearing bushing 10, that is, the second cooling flow channel 95 surrounds an outer peripheral edge of the ball bearing bushing 10. That is, the first cooling flow channel and the second cooling flow channel form a cooling system, and can also be used to prevent the bearing-related element from being damaged due to overheating.

A static shaft shoulder system exists in the welding head 1000. Since the static shaft shoulder assembly 300 is not driven by the rotating spindle 1 to rotate during friction stir welding, the cutting tool 440 rotates independently during friction stir welding, and the shaft shoulder 302 only slides relative to a workpiece surface. Therefore, friction between the shaft shoulder and the workpiece surface is reduced and thermal input during friction stir welding is reduced.

A cutting tool exit system exists in the welding head 1000. Generally, the friction stir welding includes a tool entering process, a welding process, and a tool exit process. The cutting tool 440 may expose from the tool hole 301 of the static shaft shoulder ring 320 in the tool entering process and the welding process and start to weld the workpieces. In this case, the piston spring 30 pulls up the cutting tool exit pressure ring 310 and uses the second guide post 70 and the second linear bearing 80 to allow the static shaft shoulder ring 320 to not rotate but to axially slide up and down. In the cutting tool exit process, the machining shaft starts to move away from the workpieces and drives the cutting tool 440 to start to exit the workpieces. In this case, if the shaft shoulder does not press against the workpieces, an exit hole is formed at a position in which the cutting tool 440 exits the workpieces, and the exit hole needs to be repaired subsequently, or a part generating the exit hole needs to be removed. Since the present invention includes the piston 40, during the tool exit process, the piston 40 may be driven by oil pressure to start operation, so that the shaft shoulder 302 of the static shaft shoulder ring 320 keeps pressing against the workpieces when the cutting tool 440 is exited. This action can ensure that an exit hole is not generated on the workpiece surface after the cutting tool is exited, thereby improving quality of welding.

A forge force transmission system exists in the welding head 1000. During welding, a tip of the cutting tool 440 pierces into the workpieces, the tool holder spring 430 is compressed to provide a forge force required for welding, and a size of the forge force can be controlled by a compression amount of the tool holder spring 430. Because the torque transmission system of the present invention allows the cutting tool 440 to axially slide up and down, even if the workpiece surface is uneven, the cutting tool 440 and the shaft shoulder 302 can follow the workpiece surface well. Because the forge force is provided by the tool holder spring 430, elasticity of the tool holder spring 430 only changes slightly in a process that the cutting tool follows the workpiece surface, and a great change or disappearance of the forge force is not caused, thereby overcoming a problem that welding quality is affected due to the uneven workpiece surface.

A valve switch system exists in the welding head 1000. The present invention includes a valve body 450 linked to the cutting tool 440. Therefore, when the tip of the cutting tool 440 pierces into the workpieces and retracts axially, the valve body 450 leaves an original position and no longer seals the valve 416. When a relative position of the valve body 450 and the valve 416 changes, pressure and a flow rate of the gas flow through the valve 416 change accordingly, so that at least one of the first cooling flow channel, the cone flow channel, and even a flow channel on upstream of the cone flow channel generates a fluid parameter change. In this case, the fluid parameter sensor 120 can determine a position of the tip of cutting tool 440 piercing into the workpieces according to the sensed fluid parameter change, and is configured to adjust an axial movement amount of the machining shaft, so that the compression amount of the tool holder spring 430 can be controlled, thereby controlling the forge force required for welding. In addition, because the gas flow is sprayed out from the gas nozzle 304 toward the workpieces, when an axial distance between the gas nozzle disk 303 and the workpieces changes during welding, the pressure and flow rate of the gas flow through the gas nozzle 304 also change, thereby generating a fluid parameter change in the first cooling flow channel and the fluid parameter change can be sensed by the fluid parameter sensor 120. In this way, the control system can determine a cutting tool entering depth.

In addition, due to integration of the plurality of functions, the welding head 1000 of the present invention can be modularly clamped and arranged on the machining shaft. For example, when a numerical control machining center performs milling, a welding head module is not mounted on the machining shaft. When friction stir welding is subsequently performed, the welding head 1000 of the present invention can be modularized to perform automatic clamping exchange, to implement a function of fully automatic mold changing for friction stir welding.

Figure 10:
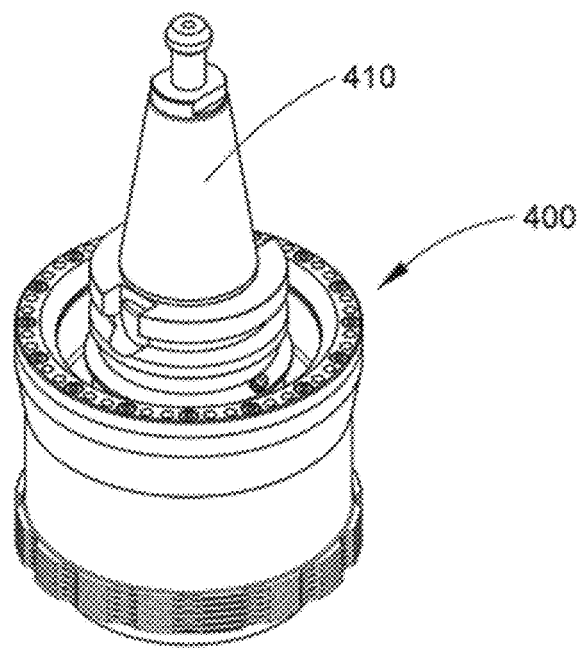
FIG. 10 is a three-dimensional view of an embodiment of a friction stir welding tool holder of the present invention.
Figure 11:
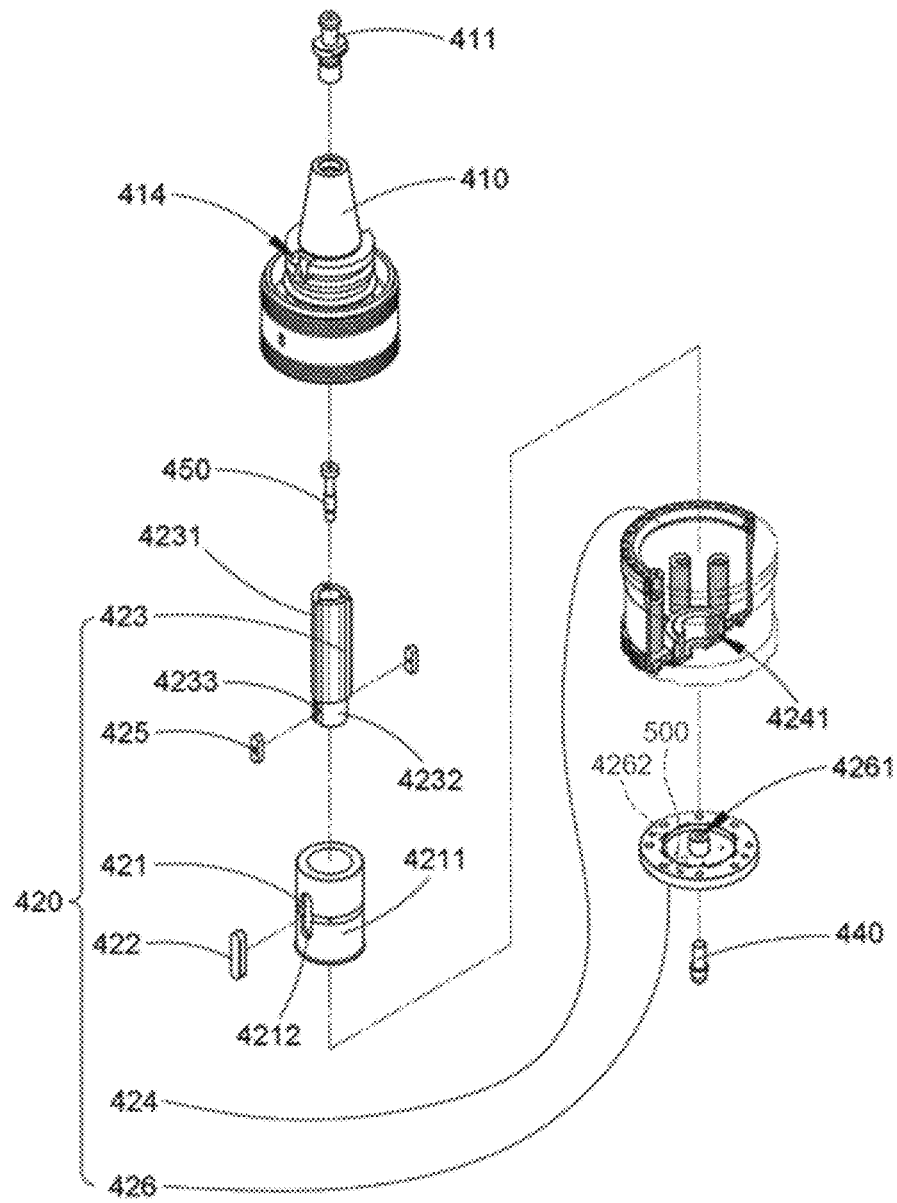
FIG. 11 is an exploded view of an embodiment of a friction stir welding tool holder according to the present invention.
Figure 12:
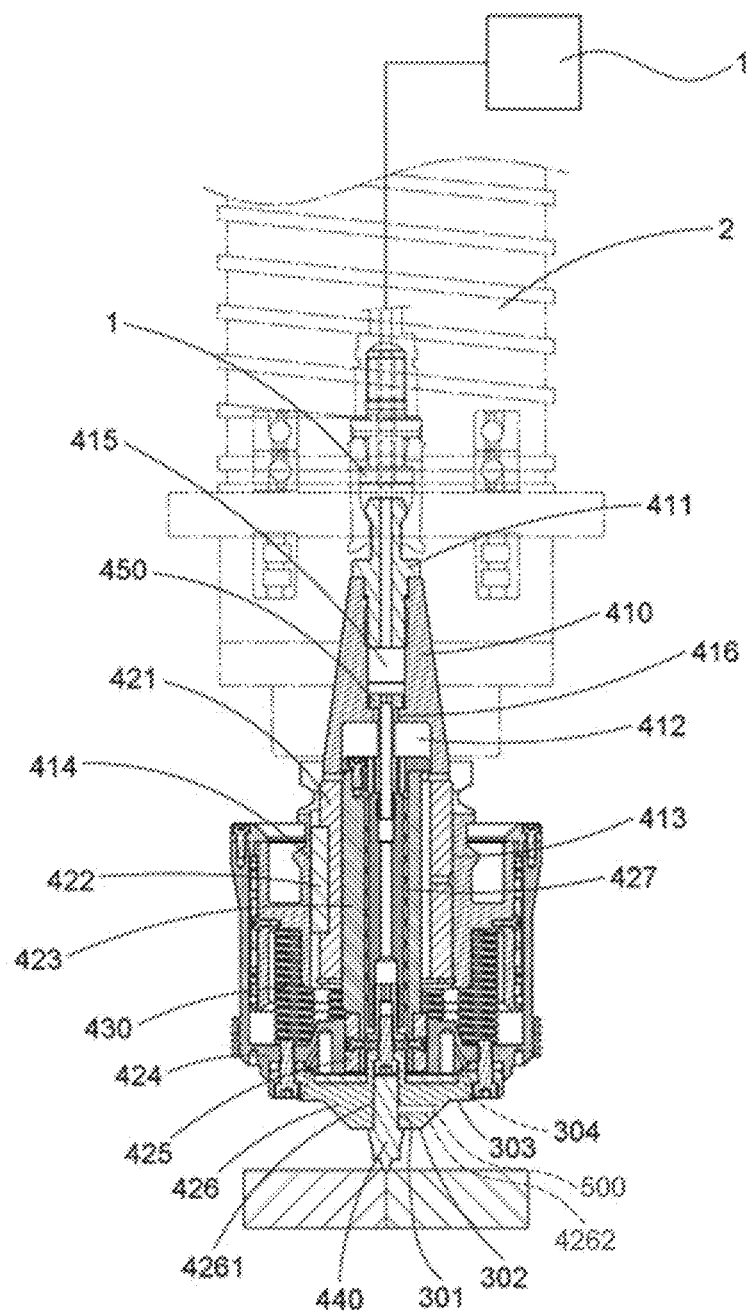
FIG. 12 is a schematic cross-sectional view of an embodiment of a friction stir welding tool holder according to the present invention.
Figure 13:
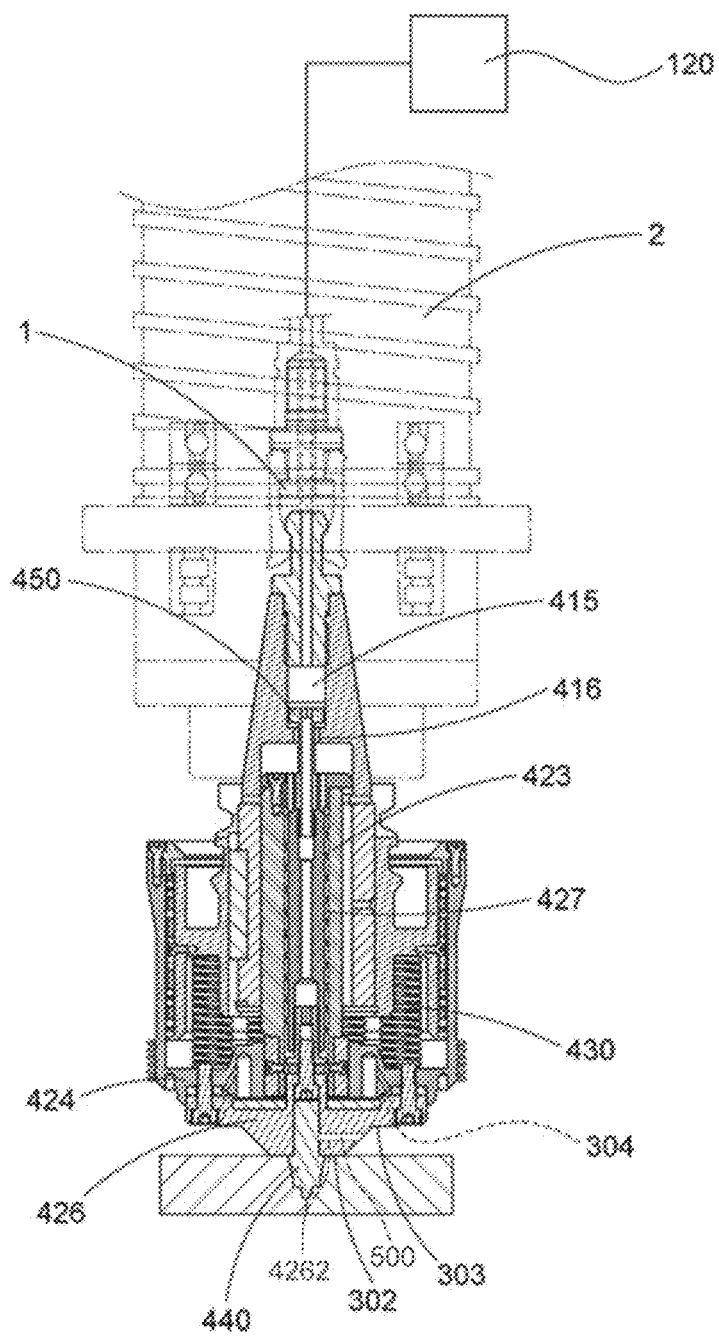
FIG. 13 is a schematic cross-sectional view of a friction stir welding process of an embodiment of a friction stir welding tool holder according to the present invention.

Referring to FIG. 10 to FIG. 13, an embodiment of a welding tool holder of the present invention is drawn. The welding tool holder 400 may be mounted on a machining shaft of a machine tool to perform friction stir welding on two workpieces, and the machining shaft has a rotating spindle 1 and a spindle frame 2 accommodating the rotating spindle 1.

The welding tool holder 400 is for mounting on the rotating spindle 1, and has a tool holder cone 410, a torque transmission system 420, at least one tool holder spring 430, a cutting tool 440, a valve body 450, and a fluid parameter sensor 120. An end of the tool holder cone 410 is for mounting on the rotating spindle 1 and is provided with a pull rod bolt 411. The tool holder cone 410 has a cone accommodation cavity, the cone accommodation cavity has a spline sliding joint section 412, a bushing accommodation section 413 adjacent to the spline sliding joint section 412, and a first splined groove 414 formed on the bushing accommodation section 413. For cooling and tool holder control purposes, a cone flow channel 415 is further formed in the tool holder cone 410. The cone flow channel 415 has a valve 416, and a gas flow can be introduced into the cone flow channel 415 during friction stir welding. The torque transmission system 420 includes a spline bushing 421, a first parallel spline 422, a spline pivot 423, a spring seat 424, a second parallel spline 425, and a tool locking ring 426. The spline bushing 421 is accommodated in the bushing accommodation section 413. The spline bushing 421 has a bushing outer surface 4211 and a bushing splined groove 4212 formed on the bushing outer surface 4211. The first parallel spline 422 is splined between the tool holder cone 410 and the spline bushing 421 and is accommodated in the first splined groove 414 and the bushing splined groove 4212, and is configured to transmit torque between the tool holder cone 410 and the spline bushing 421. The spline pivot 423 may be axially slidably arranged through and splined with the spline bushing 421. The spline pivot 423 has a spline head end 4231 axially slidable on the spline sliding joint section 412 and a spline tail end 4232, and the spline tail end 4232 is not accommodated in the spline bushing 421 and forms a spline splined groove 4233. The spring seat 424 has a spring seat accommodation cavity and a second splined groove 4241 formed in the spring seat accommodation cavity, where the spring seat accommodation cavity is configured to accommodate a part of the spline pivot 423. The second parallel spline 425 is splined between the spline pivot 423 and the spring seat 424 and is accommodated in the spline splined groove 4233 and the second splined groove 4241 to transmit torque between the spline pivot 423 and the spring seat 424. The tool locking ring 426 is fixedly connected to the spring seat 424 and has a cutting tool hole 301, a tool accommodation groove 4261, a shaft shoulder 302 surrounding the tool hole 301, a gas nozzle disk 303 surrounding the shaft shoulder 302, and at least one gas nozzle 304 formed on the gas nozzle disk 303. A first cooling flow channel 427 is further formed in the torque transmission system 420, the first cooling flow channel 427 extends through the spline pivot 423, the spring seat 424, and the tool locking ring 426, and the gas nozzle 304 is in communication with the first cooling flow channel 427. The tool holder spring 430 is arranged between the tool holder cone 410 and the spring seat 424, and is mainly configured to provide a forge force required for friction stir welding. The cutting tool 440 is arranged in the tool accommodation groove 4261 and has a machining end protruding from the tool accommodation groove 4261, and a part of the cutting tool 440 may protrude from the tool hole 301. Through the torque transmission system 420, torque can be transmitted from the tool holder cone 410 to the cutting tool 440, and the spline pivot 423, the spring seat 424, the tool locking ring 426, and the cutting tool 440 are allowed to be axially movable to the tool holder cone 410.

In addition, the tool locking ring 426 further includes a laterally arranged thermal sensing slot 4262.

A thermal sensor 500 is inserted in the thermal sensing slot 4262 to sense a temperature of the cutting tool 440 at any time. In some embodiments, the thermal sensor 500 is wirelessly connected to a terminal (not shown). In some embodiments, the thermal sensor 500 is a thermal sensing probe.

The valve body 450 is arranged on the spline pivot 423 and linked to the cutting tool 440, and selectively seals the valve 416. When the valve body 450 seals the valve 416, the cone flow channel 415 is not in communication with the first cooling flow channel 427. When the valve body 450 does not seal the valve 416, the cone flow channel 415 is in communication with the first cooling flow channel 427, so that the gas flow can flow through the cone flow channel 415 and the first cooling flow channel 427 in sequence and is sprayed out from the gas nozzle 304. The fluid parameter sensor 120 is configured to sense a fluid parameter change of the gas flow in the flow channel, thereby achieving the purpose of cooling and tool holder control. The detailed principle is described below. The fluid parameter sensor 120 may be arranged at any location at which a gas flow fluid parameter can be sensed. For example, the fluid parameter sensor may be arranged in the cone flow channel, the first cooling flow channel, or even a gas flow channel inside a machining shaft on upstream of the cone flow channel, provided that a fluid parameter change of the gas flow can be sensed.

A forge force transmission system exists in the welding tool holder. During welding, a tip of the cutting tool 440 pierces into the workpieces, the tool holder spring 430 is compressed to provide a forge force required for welding, and a size of the forge force can be controlled by a compression amount of the tool holder spring 430. Because the torque transmission system of the present invention allows the cutting tool 440 to axially slide up and down, even if the workpiece surface is uneven, the cutting tool 440 and the shaft shoulder 302 can follow the workpiece surface well. Because the forge force is provided by the tool holder spring 430, elasticity of the tool holder spring 430 only changes slightly in a process that the cutting tool follows the workpiece surface, and a great change or disappearance of the forge force is not caused, thereby overcoming a problem that welding quality is affected due to the uneven workpiece surface.

A valve switch system exists in the welding tool holder. The present invention includes a valve body 450 linked to the cutting tool 440. Therefore, when the tip of the cutting tool 440 pierces into the workpieces and retracts axially, the valve body 450 leaves an original position and no longer seals the valve 416. When a relative position of the valve body 450 and the valve 416 changes, pressure and a flow rate of the gas flow through the valve 416 change accordingly, so that at least one of the first cooling flow channel, the cone flow channel, and even a flow channel on upstream of the cone flow channel generates a fluid parameter change. In this case, the fluid parameter sensor 120 can determine a position of the tip of cutting tool 440 piercing into the workpieces according to the sensed fluid parameter change, and is configured to adjust an axial movement amount of the machining shaft, so that the compression amount of the tool holder spring 430 can be controlled, thereby controlling the forge force required for welding. In addition, because the gas flow is sprayed out from the gas nozzle 304 toward the workpieces, when an axial distance between the gas nozzle disk 303 and the workpieces changes during welding, the pressure and flow rate of the gas flow through the gas nozzle 304 also change, thereby generating a fluid parameter change in the first cooling flow channel and the fluid parameter change can be sensed by the fluid parameter sensor 120. In this way, the control system can determine a cutting tool entering depth.

In addition, due to integration of the plurality of functions, the welding tool holder of the present invention can be modularly clamped and arranged on the machining shaft. For example, when a numerical control machining center performs milling, a welding tool holder module is not mounted on the machining shaft. When friction stir welding is subsequently performed, the welding tool holder of the present invention can be modularized to perform automatic clamping exchange, to implement a function of fully automatic mold changing for friction stir welding.

In summary, in the friction stir welding head 1000 and the welding tool holder 2000 of the present invention, by setting a thermal sensor 500 in a static shaft shoulder assembly 300 of a welding head 1000 and/or a tool locking ring 426 of a tool holder 2000, damage to a structure of a cutting tool 440 is avoided, structural strength is maintained, and a temperature of the cutting tool 440 can be sensed to monitor a stir temperature in real time.

What is claimed is:

1. A friction stir welding tool holder, for mounting on a rotating spindle of a machining shaft of a machine tool, and comprising:
   a tool holder cone, wherein an end of the tool holder cone is connected to the rotating spindle, a cone flow channel is formed in the tool holder cone, the cone flow channel has a valve, and the tool holder cone further has a tool locking ring, and the tool locking ring further has a tool accommodation groove axially arranged and a thermal sensing slot laterally arranged; a cutting tool, axially movable relative to the tool holder cone, wherein the cutting tool is arranged in the tool accommodation groove and has a machining end protruding from the tool accommodation groove; a torque transmission system, arranged between the tool holder cone and the cutting tool to transmit torque from the tool holder cone to the cutting tool; and
   a thermal sensor, inserted in the thermal sensing slot to sense a temperature of the cutting tool at any time.

2. The friction stir welding tool holder according to claim 1, wherein a first cooling flow channel is formed in the torque transmission system; the friction stir welding tool holder further comprises a valve body, linked to the cutting tool and selectively sealing the valve; when the cutting tool is in contact with two workpieces and moves axially toward the tool holder cone, the valve body does not seal the valve, so that the cone flow channel is in communication with the first cooling flow channel; and when the cutting tool is not in contact with the two workpieces, the valve body seals the valve, so that the cone flow channel is not in communication with the first cooling flow channel.

3. The friction stir welding tool holder according to claim 2, wherein the thermal sensor is wirelessly connected to a terminal and the thermal sensor is a thermal sensing probe.

4. The friction stir welding tool holder according to claim 1, wherein a cone accommodation cavity is formed in the tool holder cone, and the cone accommodation cavity has a spline sliding joint section, a bushing accommodation section adjacent to the spline sliding joint section, and a first splined groove formed in the bushing accommodation section; and the torque transmission system comprises: a spline bushing, accommodated in the bushing accommodation section and having a bushing outer surface and a bushing splined groove formed on the bushing outer surface; a first parallel spline, splined between the tool holder cone and the spline bushing and accommodated in the first splined groove and the bushing splined groove, and configured to transmit torque between the tool holder cone and the spline bushing; a spline pivot, axially slidably arranged through and splined with the spline bushing, wherein the spline pivot has a spline head end axially slidable on the spline sliding joint section and a spline tail end, and the spline tail end is not accommodated in the spline bushing and forms a spline splined groove; a spring seat, having a spring seat accommodation cavity and a second splined groove formed in the spring seat accommodation cavity, wherein the spring seat accommodation cavity is configured to accommodate a part of the spline pivot; a second parallel spline, splined between the spline pivot and the spring seat and accommodated in the spline splined groove and the second splined groove, and configured to transmit torque between the spline pivot and the spring seat; and the tool locking ring, fixedly connected to the spring seat, wherein the first cooling flow channel runs through the spline pivot, the spring seat, and the tool locking ring.

* * * * *